(12) United States Patent
Luo et al.

(10) Patent No.: US 12,531,769 B2
(45) Date of Patent: Jan. 20, 2026

(54) COMMUNICATION METHOD, APPARATUS, AND SYSTEM

(71) Applicant: HUAWEI TECHNOLOGIES CO., LTD., Guangdong (CN)

(72) Inventors: Zhe Luo, Shanghai (CN); Yu Gao, Shenzhen (CN); Guohua Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 540 days.

(21) Appl. No.: 17/988,018

(22) Filed: Nov. 16, 2022

(65) Prior Publication Data
US 2023/0121294 A1    Apr. 20, 2023

Related U.S. Application Data

(63) Continuation of application No. PCT/CN2021/092880, filed on May 10, 2021.

(30) Foreign Application Priority Data

May 18, 2020 (CN) .......................... 202010420667.2

(51) Int. Cl.
*H04L 27/26* (2006.01)
*H04L 5/00* (2006.01)

(52) U.S. Cl.
CPC ........ *H04L 27/2613* (2013.01); *H04L 5/0048* (2013.01)

(58) Field of Classification Search
CPC ............... H04L 27/2613; H04L 5/0048; H04L 27/26035; H04L 27/2639; H04L 25/03821;
(Continued)

(56) References Cited

U.S. PATENT DOCUMENTS 9,465,115 B2 * 10/2016 Wishart .................. G01S 19/37
2006/0280114 A1 12/2006 Osseiran et al.
(Continued)

FOREIGN PATENT DOCUMENTS

CN    102752259 A    10/2012
CN    102804658 A    11/2012
(Continued)

OTHER PUBLICATIONS

Hadani et al, "OTFS: A New Generation of Modulation Addressing the Challenges of 5G" Cohere Technologies White Paper, Feb. 2018 (Year: 2018).*
(Continued)

*Primary Examiner* — Omer S Mian
(74) *Attorney, Agent, or Firm* — Fish & Richardson P.C.

(57) ABSTRACT

Embodiments of this application provide a communication method. The method includes: generating a first reference signal, where the first reference signal is two-dimensional orthogonal to a second reference signal, the second reference signal is a reference signal obtained after delay $\tau$ transform and Doppler frequency shift $v$ transform are performed on the first reference signal in a communication process, $0 \leq \tau \leq \tau_{max}$, $0 \leq |v| \leq v_{max}$, $\tau \neq 0$ or $v \neq 0$, $\tau_{max}$ is a first threshold, $v_{max}$ is a second threshold, and $|x|$ represents an absolute value of x; and transmitting the first reference signal.

20 Claims, 6 Drawing Sheets

(58) Field of Classification Search
CPC ............... H04L 27/2602; H04L 27/261; H04J 13/0062; H04B 7/1855
See application file for complete search history.

(56) References Cited

U.S. PATENT DOCUMENTS

| | | | |
|---|---|---|---|
| 2009/0161779 | A1 | 6/2009 | Zhidkov et al. |
| 2012/0155423 | A1 | 6/2012 | Kishiyama et al. |
| 2015/0236825 | A1 | 8/2015 | Park et al. |
| 2021/0028877 | A1* | 1/2021 | Rakib ................ H04J 11/00 |
| 2022/0311496 | A1* | 9/2022 | Long .................. H04B 7/0617 |

FOREIGN PATENT DOCUMENTS

| | | | |
|---|---|---|---|
| CN | 103107969 | A | 5/2013 |
| CN | 109314619 | A | 2/2019 |
| CN | 109348739 | A | 2/2019 |
| CN | 110677361 | A | 1/2020 |
| WO | 2016099978 | A2 | 6/2016 |
| WO | 2017100666 | A1 | 6/2017 |
| WO | 2017147439 | A1 | 8/2017 |

OTHER PUBLICATIONS

Hadani et al, "OTFS—Orthogonal Time Frequency Space" Research Gate, 2016 (Year: 2016).*
NTT Docomo et al., "Downlink DM-RS Design for LTE-Advanced," 3GPP TSG RAN WG1 Meeting #58bis, R1-094338, Miyazaki, Japan, Oct. 12-16, 2009, 5 pages.
Extended European Search Report in European Appln No. 21807772.5, dated Sep. 20, 2023, 8 pages.
MediaTek Inc., "Summary of Issues and Views on Fine Time and Frequency Tracking of Channel," 3GPP TSG-RAN WG1 Meeting #89, R1-1709290, Hangzhou, China, May 15-19, 2017, 6 pages.
ETRI, "Discussion on NR Downlink Reference Signal Design," 3GPP TSG RAN WG1 Meeting #87, R1-1612219, Reno, Nevada, USA, Nov. 14-18, 2016, 6 pages.
Office Action in Chinese Appln. No. 202010420667.2, dated Apr. 6, 2022, 9 pages (with English translation).
International Search Report and Written Opinion in International Appln. No. PCT/CN2021/092880, mailed on Jul. 27, 2021, 15 pages (with English translation).
Office Action in Indian Appln. No. 202247065865, dated Jan. 27, 2023, 6 pages (with English translation).

* cited by examiner

COMMUNICATION METHOD, APPARATUS, AND SYSTEM

CROSS-REFERENCE TO RELATED APPLICATIONS

This application is a continuation of International Application No. PCT/CN2021/092880, filed on May 10, 2021, which claims priority to Chinese Patent Application No. 202010420667.2, filed on May 18, 2020. The disclosures of the aforementioned applications are hereby incorporated by reference in their entireties.

TECHNICAL FIELD

This application relates to the field of communication technologies, and in particular, to a reference signal design-related method, apparatus, and system.

BACKGROUND

Orthogonal frequency division multiplexing (orthogonal frequency division multiplexing, OFDM) is a multi-carrier modulation technology, and is mainly applied to a communication scenario in which an object moves at a medium or low speed. However, when the object moves at a high speed, fast time-varying of a wireless channel presents time selective fading, and Doppler spread caused by relative high-speed movement of a communication device or high-speed movement of a scatterer damages orthogonality between OFDM subcarriers. Consequently, inter-carrier interference (inter-carrier interference, ICI) that affects performance of a communication system is generated.

Channel state information obtained through channel estimation is used to balance symbols received by a receive end device. This is an effective method for suppressing ICI. However, in the conventional technology, for a time and frequency doubly selective channel, it is very difficult to obtain an important parameter of channel state information: a spreading function (spreading function) of a channel.

SUMMARY

Embodiments of this application provide a communication method and apparatus, to more simply obtain a spreading function of a channel, to quickly and accurately suppress ICI generated when a communication device moves at a high speed.

According to a first aspect, an embodiment of this application provides a communication method. The method includes: generating a first reference signal, where the first reference signal is two-dimensional orthogonal to a second reference signal, the second reference signal is a reference signal obtained after delay $\tau$ transform and Doppler translation $v$ transform are performed on the first reference signal in a communication process, $0 \leq \tau \leq \tau_{max}$, $0 \leq |v| \leq v_{max}$, $\tau \neq 0$ or $v \neq 0$, $\tau_{max}$ is a first threshold, $v_{max}$ is a second threshold, and $|x|$ represents an absolute value of x; and transmitting the first reference signal.

According to a second aspect, an embodiment of this application provides another communication method. The method includes: receiving a fifth reference signal, where the fifth reference signal includes a second reference signal, the second reference signal is two-dimensional orthogonal to a first reference signal, the second reference signal is a reference signal obtained after delay $\tau$ transform and Doppler translation $v$ transform are performed on the first reference signal in a communication process, $0 \leq \tau \leq \tau_{max}$, $0 \leq |v| \leq v_{max}$, $\tau \neq 0$ or $v \neq 0$, $\tau_{max}$ is a first threshold, $v_{max}$ is a second threshold, and $|x|$ represents an absolute value of x; and obtaining channel state information based on the fifth reference signal.

In this case, a spreading function of a channel may be obtained through a two-dimensional correlation operation, to obtain the channel state information to estimate the channel. This manner of obtaining the spreading function of the channel is simple, fast, and accurate. Therefore, performance of a communication system is greatly improved.

With reference to the first aspect and/or the second aspect, in a possible design, the method according to the first aspect may be performed by a transmit end device. The transmit end device may be a network device, and the first reference signal may be understood as a reference signal transmitted at a transmit end. In this case, the first reference signal may be a downlink reference signal. The transmit end device may be a terminal device. In this case, the first reference signal may be an uplink reference signal. The method according to the second aspect may be performed by a receive end device, and the receive end device may be a terminal device or a network device. The second reference signal may be understood as a reference signal obtained at the receive end device.

With reference to the first aspect and/or the second aspect, in a possible design, the first reference signal is two-dimensional quasi-orthogonal to a third reference signal, the third reference signal is a reference signal obtained after $\tau$ transform and $v$ transform are performed on a fourth reference signal, and code division multiplexing is performed on the first reference signal and the fourth reference signal. The fifth reference signal further includes the third reference signal.

In this case, cross-correlation between the first reference signal and the fourth reference signal on which code division multiplexing is performed is good, so that a multi-antenna transmission scenario can be supported, and a capacity of the communication system is expanded.

With reference to the first aspect and/or the second aspect, in a possible design, a frequency domain spacing between resource elements occupied by the first reference signal is proportional to a length of a frequency domain range of the first reference signal, and is inversely proportional to $\tau_{max}$; and a time domain spacing between the resource elements occupied by the first reference signal is proportional to a length of a time domain range of the first reference signal, and is inversely proportional to $v_{max}$.

Such a design helps obtain good signal autocorrelation and cross-correlation characteristics.

With reference to the first aspect and/or the second aspect, in a possible design, an expression of the first reference signal is:

$$S_{2d-sZC}(n, l) = \begin{cases} \exp\left(\dfrac{-j\pi k_n u_n \beta(\beta+1)}{N} + \dfrac{-j\pi k_l u_l \gamma(\gamma+1)}{M}\right), & n = \alpha_n + \beta k_n,\ l = \alpha_l + \gamma k_l \\ 0, & n \neq \alpha_n + \beta k_n,\ l \neq \alpha_l + \gamma k_l \end{cases}$$

where n and l are respectively a subcarrier index number and a symbol index number of the resource element occupied by the first reference signal, $n \geq 0$, $l \geq 0$, $u_n$ and $u_l$ represent roots of the first reference signal, $\alpha_n$ and $\alpha_l$ respectively represent a frequency domain offset and a time-frequency offset of the first reference signal, $k_n$ and $k_l$ respectively represent the frequency domain spacing and the time domain spacing between the resource elements occupied by the first reference signal, N is the length of the frequency domain range of the first reference signal, M is the length of the time domain range of the first reference signal, $u_n$, $u_l$, $α_n$, $α_l$, $k_n$, and $k_l$ are all positive integers, β and γ are integers greater than or equal to 0, and $$\frac{N}{k_n} \text{ and } M/k_l$$

are prime numbers.

With reference to the first aspect and/or the second aspect, in a possible design, an expression of the first reference signal is:

$$S_{2d-sZc}(n, l) = \begin{cases} \exp\left(\frac{-j\pi k_n u_n \beta(\beta+1)}{N} + \frac{-j\pi k_l u_l \gamma(\gamma+1)}{M} + \frac{-j\pi k_n u_n \beta(\beta+1)}{N_1}\right), & n = a_n + \beta k_n, l = a_l + \gamma k_l \\ 0, & n = \end{cases}$$

where n and l are respectively a subcarrier index number and a symbol index number of the resource element occupied by the first reference signal, n≥0, l≥0, $u_n$ and $u_l$ represent roots of the first reference signal, $α_n$ and $α_l$ respectively represent a frequency domain offset and a time-frequency offset of the first reference signal, $k_n$ and $k_l$ respectively represent the frequency domain spacing and the time domain spacing between the resource elements occupied by the first reference signal, N is the length of the frequency domain range of the first reference signal, M is the length of the time domain range of the first reference signal, $u_n$, $u_l$, $α_n$, $α_l$, $k_n$, and $k_l$ are all positive integers, β and γ are integers greater than or equal to 0, $$\frac{N}{k_n} \text{ and } M/k_l$$

are prime numbers, $N_1$ is a quantity of sampling points of a symbol corresponding to l, $N_2$ is a difference between a quantity of sampling points of a cyclic prefix of a first symbol and a quantity of sampling points of a cyclic prefix of a second symbol, the first symbol is a first symbol of a slot, the second symbol is any symbol other than the first slot in the slot, and $M_l$ is a serial number of a symbol corresponding to l in a slot of the symbol corresponding to l.

In this design, it is considered that a length of a cyclic prefix of a start symbol in a slot is different from a length of a cyclic prefix of another symbol. This may affect an autocorrelation characteristic of the first reference signal and a cross-correlation characteristic between the first reference signal and another signal. Therefore, the expression of the first reference signal is further modified to suppress this affection.

With reference to the first aspect and/or the second aspect, in a possible design, $$k_n = \frac{N}{\tau_{max}} \text{ and } k_l = \frac{M}{2v_{max}}.$$

With reference to the first aspect and/or the second aspect, in a possible design, a cycle of a pattern of the resource element occupied by the first reference signal is an integral multiple of a slot corresponding to the first reference signal.

According to a third aspect, this application provides an apparatus. The apparatus may be a transmit end device, may be an apparatus in a transmit end device, or may be an apparatus that can be used with a transmit end device. The apparatus may include a processing module and a transceiver module, and the processing module and the transceiver module may perform corresponding functions of the method according to the first aspect and any design in the first aspect.

In a possible design, the transmit end device is a network device or a terminal device.

According to a fourth aspect, this application provides an apparatus. The apparatus may be a receive end device, may be an apparatus in a receive end device, or may be an apparatus that can be used with a receive end device. The apparatus may include a processing module and a transceiver module, and the processing module and the transceiver module may perform corresponding functions of the method according to the second aspect and any design in the second aspect.

In a possible design, a transmit end device is a terminal device or a network device.

According to a fifth aspect, an embodiment of this application provides an apparatus. The apparatus includes a processor, configured to implement the method according to the first aspect and any possible design in the first aspect. The apparatus may further include a memory, configured to store instructions and data. The memory is coupled to the processor; and when the processor executes program instructions stored in the memory, the method according to the first aspect and any possible design in the first aspect may be implemented. The apparatus may further include a communication interface. The communication interface is used by the apparatus to communicate with another device. For example, the communication interface may be a transceiver, a circuit, a bus, a module, or another type of communication interface.

According to a sixth aspect, an embodiment of this application provides an apparatus. The apparatus includes a processor, configured to implement the method according to the second aspect and any possible design in the second aspect. The apparatus may further include a memory, configured to store instructions and data. The memory is coupled to the processor; and when the processor executes program instructions stored in the memory, the method according to the second aspect and any possible design in the second aspect may be implemented. The apparatus may further include a communication interface. The communication interface is used by the apparatus to communicate with another device. For example, the communication interface may be a transceiver, a circuit, a bus, a module, or another type of communication interface.

According to a seventh aspect, an embodiment of this application further provides a computer-readable storage medium. The computer-readable storage medium includes instructions; and when the instructions are run on a computer, the computer is enabled to perform the method according to the first aspect and any possible design in the first aspect and the method according to the second aspect and any possible design in the second aspect.

According to an eighth aspect, an embodiment of this application further provides a chip system. The chip system includes a processor, and may further include a memory, configured to implement the method according to the first aspect and any possible design in the first aspect and the method according to the second aspect and any possible design in the second aspect. The chip system may include a chip, or may include a chip and another discrete device.

According to a ninth aspect, an embodiment of this application further provides a computer program product. The computer program product includes instructions; and when the instructions are run on a computer, the computer is enabled to perform the method according to the first aspect and any possible design in the first aspect and the method according to the second aspect and any possible design in the second aspect.

According to a tenth aspect, an embodiment of this application further provides a communication system. The communication system includes the apparatus according to the third aspect and the apparatus according to the fourth aspect, or includes the apparatus according to the fifth aspect and the apparatus according to the sixth aspect.

In addition, for technical effects brought by any possible design manner in the third aspect to the tenth aspect, refer to the technical effects brought by different design manners in the method parts. Details are not described herein again.

BRIEF DESCRIPTION OF DRAWINGS

FIG. 4(*b*) is a diagram of a cross-correlation characteristic of a first reference signal according to an embodiment of this application;

DESCRIPTION OF EMBODIMENTS

In embodiments of this application, "at least one" means one or more, and "a plurality of" means two or more than two. The term "and/or" describes an association relationship between associated objects, and represents that three relationships may exist. For example, A and/or B may represent the following cases: Only A exists, both A and B exist, and only B exists, where A and B may be singular or plural. The character "/" usually represents an "or" relationship between the associated objects. The term "at least one of the following items (pieces)" or a similar expression thereof refers to any combination of these items, including any combination of singular items (pieces) or plural items (pieces). For example, at least one item (piece) of a, b, or c may indicate a, b, c, a and b, a and c, b and c, or a, b, and c. Each of a, b, and c may be an element, or may be a set including one or more elements.

In embodiments of this application, "for example", "in some embodiments", "in another embodiment", "in an implementation", and the like are used to represent examples, illustrations, or descriptions. Any embodiment or design scheme described as an "example" in this application should not be explained as being more preferred or having more advantages than another embodiment or design scheme. To be specific, "for example" is used to present a concept in a specific manner.

In embodiments of this application, communication and transmission may be sometimes mixed. It should be noted that, when differentiation is not emphasized, meanings expressed by communication and transmission are the same. For example, transmission may include transmitting and/or receiving, and may be a noun or may be a verb.

In embodiments of this application, a formula $e^x$ is equivalent to $\exp(x)$.

It should be noted that the words "first", "second", and the like in embodiments of this application are merely used for distinguishing, and cannot be understood as indicating or implying relative importance, or as indicating or implying a sequence. In embodiments of this application, "equal to" may be used with "greater than" and is applicable to a technical solution in which a "greater than" case occurs. In addition, "equal to" may be used with "less than" and is applicable to a technical solution in which a "less than" case occurs. It should be noted that when being used with "greater than", "equal to" is not used with "less than", and when being used with "less than", "equal to" is not used with "greater than".

Figure 1:
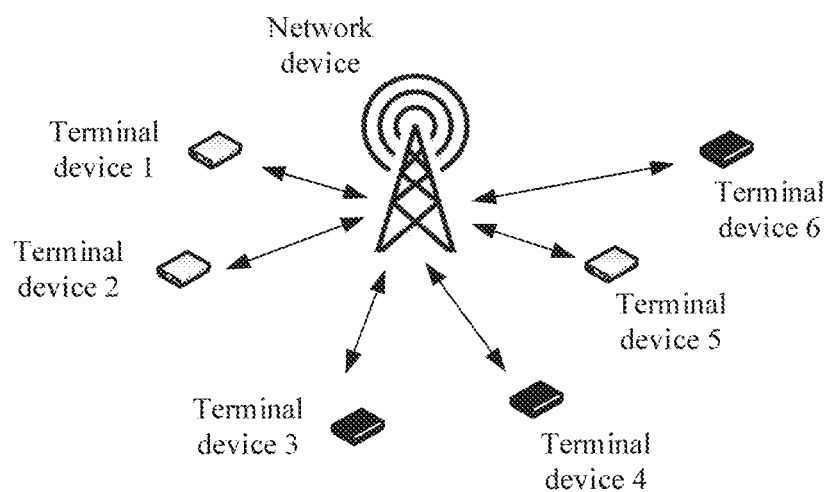
FIG. 1 is a schematic diagram of a communication scenario according to an embodiment of this application.

This application may be located in a communication scenario shown in FIG. 1. As shown in FIG. 1, terminal devices 1 to 6 may access a wireless network by using a network device, and implement uplink communication and/or downlink communication with the network device. The wireless network includes but is not limited to a long term evolution (long term evolution, LTE) system, a new radio (new radio, NR) system in a fifth generation (5th generation, 5G) mobile communication system, and a future mobile communication system. A double-headed arrow in FIG. 1 may represent that the terminal device and the network device communicate with each other through a communication channel. A time and frequency doubly selective channel is described below.

In the following, some terms in embodiments of this application are described, to help a person skilled in the art have a better understanding.

1. A terminal device: In embodiments of this application, a terminal device is a device that has a wireless transceiver function, and may be referred to as a terminal (terminal), user equipment (user equipment, UE), a mobile station (mobile station, MS), a mobile terminal (mobile terminal, MT), an access terminal device, a vehicle-mounted terminal device, an industrial control terminal device, a UE unit, a UE station, a mobile station, a remote station, a remote terminal device, a mobile device, a UE terminal device, a wireless communication device, a UE agent, a UE apparatus, or the like. The terminal device may be fixed or mobile. It should be noted that the terminal device may support at least one wireless communication technology, for example, LTE, NR, or wideband code division multiple access (wideband code division multiple access, WCDMA). For example, the terminal device may be a mobile phone (mobile phone), a pad (pad), a desktop computer, a notebook computer, an all-in-one machine, a vehicle-mounted terminal, a virtual reality (virtual reality, VR) terminal device, an augmented reality (augmented reality, AR) terminal device, a wireless terminal in industrial control (industrial control), a wireless terminal in self driving (self driving), a wireless terminal in remote medical surgery (remote medical surgery), a wireless terminal in smart grid (smart grid), a wireless terminal in transportation safety (transportation safety), a wireless terminal in smart city (smart city), a wireless terminal in smart home (smart home), a cellular phone, a cordless phone, a session initiation protocol (session initiation protocol, SIP) telephone, a wireless local loop (wireless local loop, WLL) station, a personal digital assistant (personal digital assistant, PDA), a handheld device with a wireless communication function, a computing device, another processing device connected to a wireless modem, a wearable device, a terminal device in a future mobile communication network, or a terminal device in a future evolved public land mobile network (public land mobile network, PLMN). In some embodiments of this application, the terminal may alternatively be an apparatus with a transceiver function, for example, a chip system. The chip system may include a chip, and may further include another discrete device.

2. A network device: In embodiments of this application, a network device is a device that provides a wireless communication function for a terminal device, and may also be referred to as an access network device, a radio access network (radio access network, RAN) device, or the like. The network device may support at least one wireless communication technology, for example, LTE, NR, or WCDMA. For example, the network device includes but is not limited to a next generation NodeB (generation NodeB, gNB) in a 5th generation (5th generation, 5G) mobile communication system, an evolved NodeB (evolved NodeB, eNB), a radio network controller (radio network controller, RNC), a NodeB (NodeB, NB), a base station controller (base station controller, BSC), a base transceiver station (base transceiver station, BTS), a home NodeB (for example, a home evolved NodeB or a home NodeB, HNB), a baseband unit (baseband unit, BBU), a transmission reception point (transmission reception point, TRP), a transmission point (transmission point, TP), or a mobile switching center. The network device may alternatively be a wireless controller in a cloud radio access network (cloud radio access network, CRAN) scenario, a central unit (central unit, CU), and/or a distributed unit (distributed unit, DU). Alternatively, the network device may be a relay station, an access point, a vehicle-mounted device, a terminal device, a wearable device, a network device in future mobile communication, a network device in future evolved PLMN, or the like. In some embodiments, the network device may alternatively be an apparatus that provides a wireless communication function for a terminal device, for example, a chip system. For example, the chip system may include a chip, and may further include another discrete device.

3. Communication between a terminal device and a network device: In embodiments of this application, a terminal device and a network device communicate with each other through a communication channel and a communication interface. For example, the communication interface between the terminal device and the network device may be a universal UE to network interface (universal UE to network interface, Uu air interface). When the communication interface between the terminal device and the network device is a Uu air interface, communication between the terminal device and the network device may also be referred to as Uu air interface communication.

4. A slot and a symbol: A slot may be understood as a time unit, and refers to a time length in a time domain. In embodiments of this application, data communication may be performed in a unit of time unit. Duration of one slot is related to a size of a subcarrier spacing, and duration of slots corresponding to subcarrier spacings of different sizes is different. For example, when a subcarrier spacing is 15 kHz, duration of one slot may be 1 ms. When a subcarrier spacing is 30 kHz, duration of one slot may be 0.5 ms. In embodiments of this application, one slot may include one or more symbols. For example, in a normal (normal) cyclic prefix (cyclic prefix, CP), one slot may include 14 symbols. In an extended (extended) CP, one slot may include 12 symbols. It should be understood that in embodiments of this application, a symbol may also be referred to as a time domain symbol. For example, the symbol may be an orthogonal frequency division multiplexing (orthogonal frequency division multiplexing, OFDM) symbol, or may be a discrete Fourier transform spread orthogonal frequency division multiplexing (discrete Fourier transform spread orthogonal frequency division multiplexing, DFT-s-OFDM) symbol. In addition, in embodiments of this application, a mini slot (or a mini slot) may be a time unit smaller than the slot, and one mini slot may include one or more symbols. For example, one mini slot (or a mini slot) may include two symbols, four symbols, or seven symbols. One slot may include one or more mini slots (or mini slots).

Figure 2:
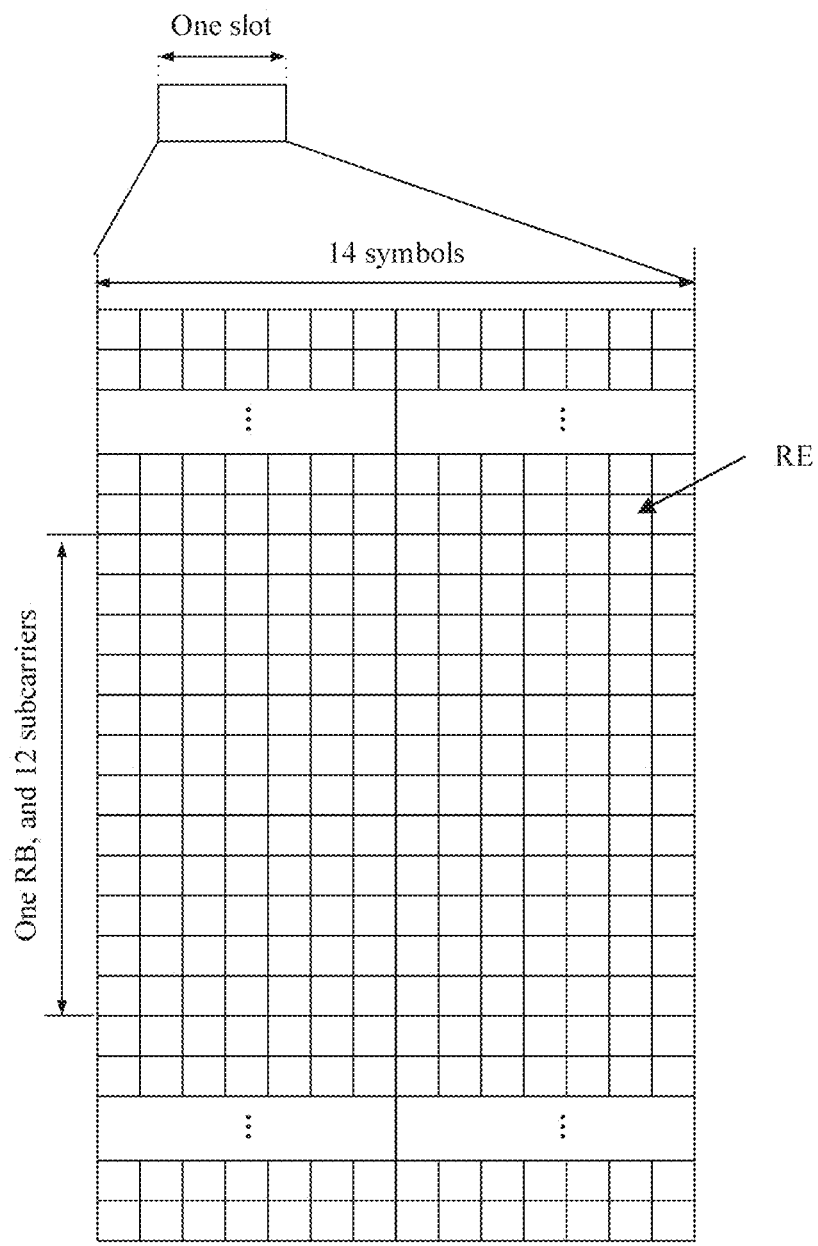
FIG. 2 is a schematic diagram of a resource grid according to an embodiment of this application.

5. A resource and a resource element (resource element, RE): In embodiments of this application, a resource may also be referred to as a time-frequency resource, is used to transmit various signals or various types of data, and may be represented by a resource grid. FIG. 2 is an example diagram of a resource grid. In the resource grid, an RE is a resource unit used to perform data transmission, or a resource unit used to perform resource mapping on to-be-transmitted data. One RE corresponds to one symbol on a time domain, for example, an OFDM symbol or a DFT-s-OFDM symbol, and corresponds to one subcarrier on a frequency domain. One RE may be used to map a complex symbol, for example, a complex symbol obtained through modulation or a complex symbol obtained through precoding. This is not limited in this application. On the frequency domain, an RB may be defined in the resource grid, and one RB on the frequency domain may include a positive integral quantity of subcarriers, for example, 12. Further, a definition of the RB may be further extended to the time domain. For example, one RB includes a positive integral quantity of subcarriers and includes a positive integral quantity of symbols on the time domain. For example, one RB is a time-frequency resource block including 12 subcarriers on the frequency domain and seven symbols on the time domain. The resource grid may include a positive integral quantity of RBs. A slot (slot) may be defined on the time domain of the resource grid or the time-frequency resource. As described above, one slot may include a positive integral quantity of symbols, for example, 14 symbols.

6. A length of a frequency domain range and a length of a time domain range that are of a reference signal: that is, a length of a frequency domain range and a length of a time domain range that are of a time-frequency resource on which channel estimation needs to be performed. For a reference signal, channel estimation is performed by using at least a part of the time-frequency resource on which channel estimation needs to be performed. In embodiments of this application, the length of the frequency domain range occupied on a frequency domain by the time-frequency resource on which channel estimation needs to be performed is defined as a length of a frequency domain range of the reference signal. In addition, the frequency domain range of the reference signal may also be referred to as a frequency domain span of the time-frequency resource on which channel estimation needs to be performed, a frequency domain span of the reference signal, or the like. For example, a unit of an OFDM communication system is a bandwidth $f_{scs}$ of one subcarrier. In embodiments of this application, the length of the time domain range occupied on a time domain by the time-frequency resource on which channel estimation needs to be performed is defined as a length of a time domain range of the reference signal. In addition, the time domain range of the reference signal may also be referred to as a time domain span of the time-frequency resource on which channel estimation needs to be performed, a time domain span of the reference signal, or the like. For example, a unit of an OFDM communication system is duration $1/f_{scs}$ of one OFDM symbol on the time domain. It should be noted that the time-frequency resource on which channel estimation needs to be performed is a time-frequency resource that carries data transmitted by a transmit end device to a receive end device.

7. A time and frequency doubly selective channel and a spreading function $h(\tau,v)$ of the time and frequency doubly selective channel: A time and frequency doubly selective channel is a channel with selectivity on both a time domain and a frequency domain, or channel quality of a time and frequency doubly selective channel changes with a time and a frequency. For example, for an OFDM communication system, on a time-frequency resource on which channel estimation needs to be performed, a value of a channel coefficient $H(n,l)$ of the time and frequency doubly selective channel is different at different n and l, where n and l are respectively a subcarrier index number (a frequency domain position) and a symbol index number (a time domain position) of an RE, $0 \leq n \leq N-1$, $0 \leq l \leq M-1$, N represents a length of a frequency domain range of the time-frequency resource on which channel estimation needs to be performed, and M represents a length of a time domain range of the time-frequency resource on which channel estimation needs to be performed. In addition, "two-dimensional" involved in embodiments of this application may refer to a time domain dimension and a frequency domain dimension.

A relationship between a time-varying impulse response $g(\tau,l)$ of the time and frequency doubly selective channel and the channel coefficient $H(n,l)$ of the time and frequency doubly selective channel is shown as follows:

$$H(n, l) = \frac{1}{\sqrt{N}} \sum_{\tau} g(\tau, l) e^{j2\pi\left(\frac{\tau n}{N}\right)} \quad \text{Formula (1)}$$

$\tau$ represents a delay of an input signal passing through the time and frequency doubly selective channel, $0 \leq \tau \leq N-1$, and precision (or referred to as a unit) corresponding to $\tau$ is $1/(N*f_{scs})$. The time-varying impulse response $g(\tau,l)$ is represented on a symbol (a time domain position) l, is a response output signal of the time and frequency doubly selective channel when a unit pulse signal is input into the time and frequency doubly selective channel, and reflects a basic characteristic of the time and frequency doubly selective channel.

The spreading function $h(\tau,v)$ of the time and frequency doubly selective channel is defined as Fourier transform of the time-varying impulse response $g(\tau,l)$ of the time and frequency doubly selective channel to l, that is, $$h(\tau, v) = \frac{1}{\sqrt{M}} \sum_{l} g(\tau, l) e^{j2\pi\left(\frac{lv}{M}\right)} \quad \text{Formula (2)}$$

v represents a Doppler frequency shift of the input signal passing through the time and frequency doubly selective channel, $-M/2 \leq v \leq M/2-1$, and precision (or referred to as a unit) of v is $f_{scs}/M$.

According to the foregoing formulas (1) and (2), a relationship between the spreading function $h(\tau,v)$ of the time and frequency doubly selective channel and the channel coefficient $H(n,l)$ of the time and frequency doubly selective channel is shown as follows:

$$H(n, l) = \frac{1}{\sqrt{NM}} \sum_{\tau,v} h(\tau, v) e^{j2\pi\left(\frac{\tau n}{N} - \frac{lv}{M}\right)} \quad \text{Formula (3)}$$

It can be learned that $H(n,l)$ presents a time and frequency doubly selective characteristic because of a function of $\tau$ and v.

8. A frequency domain representation and a time domain representation of a reference signal: A reference signal is represented as $S(n,l)$ on a time-frequency domain, where n and l are respectively a subcarrier index number (a frequency domain position) and a symbol index number (a time domain position) of an RE, $0 \leq n \leq N-1$, and $0 \leq l \leq M-1$. Correspondingly, the reference signal is represented as $s(\tau,l)$ on a time domain, where l is the symbol index number, and t is an index number of a sampling point of a symbol. A relationship between the time domain representation $s(\tau,l)$ and the time-frequency domain representation $S(n,l)$ is shown as follows:

$$s(t, l) = \frac{1}{\sqrt{N}} \sum_{n} S(n, l) e^{j2\pi\left(-\frac{tn}{N}\right)}$$

A reference signal $s_2(t,l)$ obtained after delay $\tau$ transform and Doppler translation v transform are performed on a reference signal $s_1(t,l)$ is:

$$s_2(t, l) = s_2((t - \tau) \bmod N, l) e^{j2\pi\left(-\frac{lv}{M}\right)}$$

mod represents a modulo operator.

Two-dimensional correlation between the reference signal $s_1(t,l)$ and the reference signal $s_2(t,l)$ may also be understood as a two-dimensional dot product $\Sigma_{t,l} s_1(t,l) s_2^*(t,l)$, where $s_2^*(t,l)$ represents a conjugate of $s_2(t,l)$.

Channel state information on the RE can be obtained by placing a reference signal, that is, a sounding signal, on the RE. Most existing reference signals are based on a pseudo-random sequence, for example, a Golden sequence. The following describes how to obtain $h(\tau,v)$ by using an existing reference signal.

In a high-speed moving scenario, the time and frequency doubly selective channel may be classified into a line of sight (line of sight, LOS) channel or a non line of sight (non line of sight, LOS) channel. In a LOS channel scenario, a wireless signal is propagated in a straight line between a transmit end device and a receive end device without blocking, and main energy of h(τ,ν) is concentrated on a main path (a direct path), that is, h(τ,ν) has a large amplitude for only τ=τ$_0$,ν=ν$_0$, and has a small amplitude for another τ and another ν. τ$_0$ and ν$_0$ are respectively a delay and a Doppler frequency shift corresponding to the main path. In an NLOS channel scenario, there is a block between a transmit end device and a receive end device, and a wireless signal is transmitted from the transmit end device to the receive end device through reflection and/or diffraction. In this case, energy of h(τ,ν) is distributed to a plurality of paths, that is, h(τ,ν) has large amplitudes for a plurality of τ and a plurality of ν. A degree of a LOS (or an NLOS) of a communication channel is usually described by using a factor K. The factor K is defined as a ratio of energy of the main path to total energy of other paths, that is, $$K = \max|h(\tau,\nu)|^2 / (\Sigma |h(\tau,\nu)|^2 - \max|h(\tau,\nu)|^2) \quad \text{Formula (4)}$$

For example, when the factor K is greater than 8.98 decibels (dB), it may be considered that h(τ,ν) is determined based on τ$_0$ and ν$_0$ corresponding to the main path. In this case, a corresponding channel is a LOS channel. When there is only the main path, H(n,l) is a function of a delay τ$_0$ and a Doppler frequency shift ν$_0$ corresponding to the main path, that is, the formula (3) may be transformed into:

$$H(n,l) = \frac{1}{\sqrt{NM}} \sum_{\tau,\nu} h(\tau_0, \nu_0) e^{j2\pi\left(\frac{\tau_0 n}{N} - \frac{l\nu_0}{M}\right)} \quad \text{Formula (5)}$$

Therefore, τ$_0$ and ν$_0$ may be obtained in a phase differential calculation manner, that is, $$\tau_0 = \frac{N}{j2\pi(n_1 - n_2)}(\log H(n_1, l_1) - \log H(n_2, l_1)) \text{ and}$$

$$\nu_0 = \frac{-M}{j2\pi(l_1 - l_2)}(\log H(n_1, l_1) - \log H(n_1, l_2)),$$

where n$_1$ and l$_1$ respectively represent a subcarrier index number and a symbol index number of an RE 1, n$_2$ and l$_1$ respectively represent a subcarrier index number and a symbol index number of an RE 2, n$_1$ and l$_2$ respectively represent a subcarrier index number and a symbol index number of an RE 3, and the RE 1, the RE 2, and the RE 3 each are an RE that carries a reference signal.

For another example, when the factor K is less than 5 dB, h(τ,ν) is not determined based on only the delay τ$_0$ and the Doppler frequency shift ν$_0$ corresponding to the main path. In this case, a corresponding channel is an NLOS channel. Because there is no apparent main path, H(n,l) is formed through superposition of functions of τ and ν respectively corresponding to a plurality of paths. In this case, h(τ,ν) cannot be obtained by using a phase differential calculation method. As shown in formula (3), H(n,l) on each RE that carries a reference signal corresponds to an equation about h(τ,ν). Therefore, a method for obtaining h(τ,ν) of the NLOS channel may be that equations corresponding to a plurality of H(n,l) are combined, and h(τ,ν) is resolved in a minimum mean square error (minimum mean square error, MMSE) manner. When there is no prior information for h(τ,ν), h(τ,ν) includes M*N unknown numbers, and M*N equations need to be combined to perform resolution. Therefore, a reference signal needs to occupy M*N REs, that is, fully occupy a time-frequency resource on which channel estimation needs to be performed, to obtain enough equations to resolve h(τ,ν). This reference signal design in which all REs of the time-frequency resource on which channel estimation needs to be performed are fully occupied apparently cannot support data transmission.

It should be noted that for an actual time and frequency doubly selective channel, a delay range of a plurality of paths is far less than 1/f$_{scs}$, and a Doppler frequency shift range is far less than f$_{scs}$/2, that is, for τ>τ$_{max}$ or |ν|>ν$_{max}$, h(τ,ν)=0, where τ$_{max}$ represents a maximum delay of the plurality of paths, and ν$_{max}$ represents a maximum Doppler frequency shift of the plurality of paths. In this case, because h(τ,ν) includes 2τ$_{max}$ν$_{max}$ unknown numbers, even if the reference signal does not need to be placed on all the REs of the time-frequency resource on which channel estimation needs to be performed, the reference signal still needs to be placed on at least 2τ$_{max}$ν$_{max}$ REs to estimate H(n,l), to obtain enough equations to resolve h(τ,ν).

In addition, H(n,l) is affected by both noise and ICI. In this case, a requirement for accuracy of H(n,l) is higher. In addition, accuracy of h(τ,ν) is greatly affected by the accuracy of H(n,l), and H(n,l) is obtained based on channel estimation performed by using the reference signal, more reference signals need to be placed on the RE to improve the accuracy of H(n,l).

It can be learned from the foregoing that, for the NLOS channel, when h(τ,ν) needs to be resolved in an MMSE manner, algorithm complexity of the MMSE manner is high.

In addition, an existing reference signal has poor cross-correlation. Consequently, code division multiplexing cannot be performed on reference signals transmitted through different ports. This greatly increases pilot overheads, and cannot provide good support for a multi-antenna port scenario.

Embodiment 1

Based on the foregoing disadvantages in the conventional technology, this embodiment of this application proposes a communication method, which relates to reference signal generation, transmitting, and receiving. The method may be applied to the communication scenario shown in FIG. 1, so that h(τ,ν) can be obtained in a calculation manner with low complexity. This avoids using an MMSE calculation manner with high complexity. In addition, a newly generated reference signal may be used to effectively support a multi-antenna port multiplexing scenario.

Figure 3:
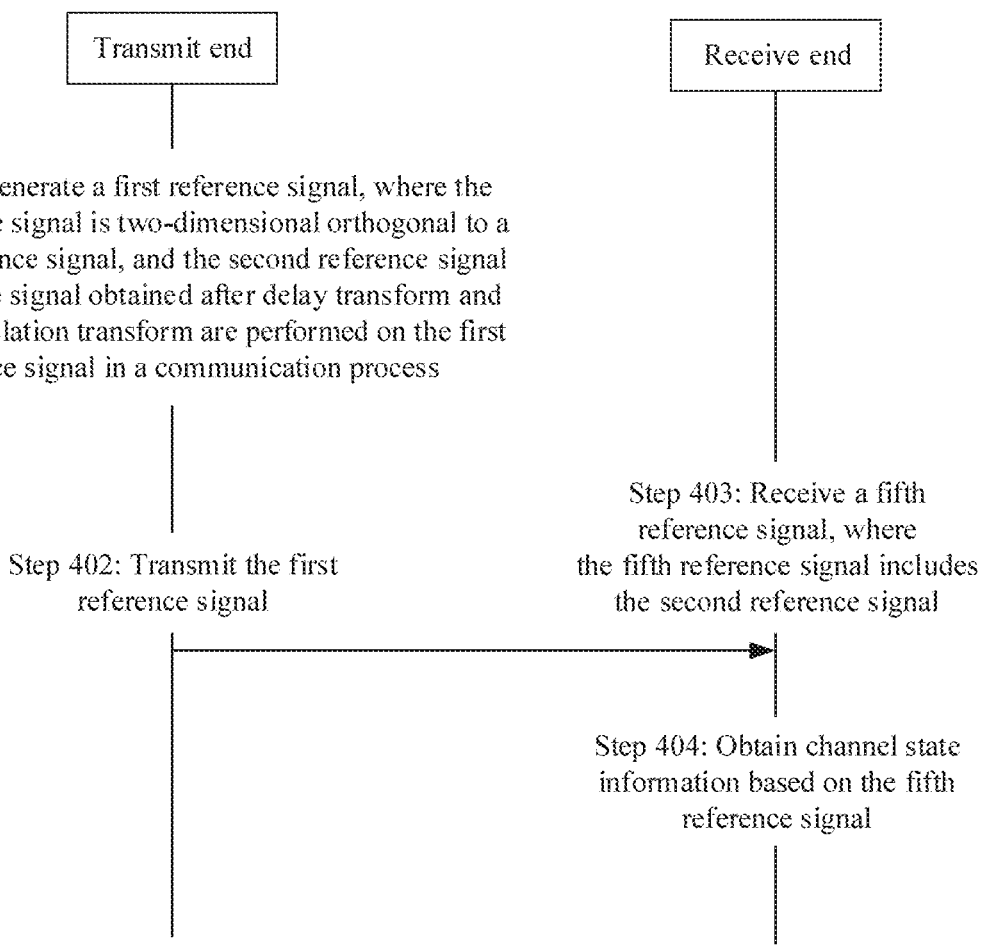
FIG. 3 is a flowchart of a communication method according to an embodiment of this application.

As shown in FIG. 3:

Step 401: Generate a first reference signal, where the first reference signal is two-dimensional orthogonal to a second reference signal, and the second reference signal is a reference signal obtained after delay τ transform and Doppler translation ν transform are performed on the first reference signal in a communication process, 0≤τ≤τ$_{max}$, 0≤|ν|≤ν$_{max}$, τ≠0 or ν≠0. τ$_{max}$ and ν$_{max}$ may be understood herein as two thresholds, and the two thresholds may be prior information, that is, a network device or a terminal device may obtain values of the two thresholds in advance.

Step 402: Transmit the first reference signal.

Step 403: Receive a fifth reference signal, where the fifth reference signal includes the second reference signal.

Channel estimation may be performed between a transmit end device and a receive end device based on a reference signal. It should be noted that a name of the transmit end device and a name of the receive end device may be relative. For example, at a specific moment, when being used as a signal transmitter, one device may be referred to as a transmit end device, and at another moment, when being used as a signal receiver, the device is referred to as a receive end device. The transmit end device transmits the first reference signal generated by the transmit end device to the receive end device. For example, the transmit end device may be a network device, and the receive end device may be a terminal device. In this case, the first reference signal may be a downlink reference signal, for example, a downlink demodulation reference signal (demodulation reference signal, DMRS) or a channel state information reference signal (channel state information reference signal, CSI-RS). For another example, the transmit end device may be a terminal device, and the receive end device may be a network device. In this case, the first reference signal may be an uplink reference signal, for example, an uplink DMRS or a sounding reference signal (sounding reference signal, SRS). A communication channel between the transmit end device and the receive end device generates time selective fading on a time domain and generates a Doppler effect on a frequency domain, that is, a delay τ and a Doppler translation ν of the channel lead to, in a transmission process, delay τ transform and Doppler translation ν transform on the first reference signal transmitted by the transmit end device, so that when arriving at the receive end device, for example, the terminal device, a received reference signal is the second reference signal.

Step 404: Obtain channel state information based on the fifth reference signal.

The receive end device may measure the channel by using the received fifth reference signal to obtain the channel state information. It should be noted that the transmit end device transmits the first reference signal. Because one or more paths (channels) are included between the transmit end device and the receive end device, the fifth reference signal received at a receive end may include one or more second reference signals that pass through different paths (channels). Optionally, if a path (channel) whose τ=0 and whose ν=0 exists between the transmit end device and the receive end device, the fifth reference signal may further include the first reference signal. The fifth reference signal may be specifically a weighted sum of the foregoing included signals. A weight corresponding to each included reference signal is reflected in a channel coefficient of each channel. In this embodiment of this application, the receive end device may perform balancing processing for data receiving by using the obtained channel state information, to suppress ICI occurring in data transmission, to improve data transmission efficiency and reliability.

Optionally, the receive end device may further feed back the channel state information to the transmit end device.

To reduce complexity of obtaining h(τ,ν) of the channel, based on the formula (3), a two-dimensional correlation operation is used to estimate h(τ,ν) in this embodiment of this application. A specific implementation is as follows:

It is assumed that the first reference signal transmitted by the transmit end device is represented as S(n,l) on a time-frequency domain, the fifth reference signal received at the receive end device is represented as Y(n,l) on the time-frequency domain, and a channel coefficient is H(n,l), then Y(n,l)=H(n,l)·S(n,l). The fifth reference signal includes the second reference signal, and optionally may further include the first reference signal. Specifically, the fifth reference signal is a weighted sum of the first reference signal and/or one or more second reference signals. A weight is reflected in the channel coefficient H(n,l). A spreading function of the channel is estimated through a two-dimensional correlation operation including two-dimensional inverse Fourier transform:

$$\hat{h}(\tau, v) = IFFT_2\{Y(n, l) \cdot S^*(n, l)\} = \quad \text{Formula (6)}$$

$$\frac{1}{\sqrt{NM}} \sum_{n,l} H(n, l) \cdot S(n, l) \cdot S^*(n, l) \cdot e^{-j2\pi\left(\frac{\tau n}{N} - \frac{lv}{M}\right)} = \sum_{t,u} h(t, u) \cdot corr(\tau - t, v - u)$$

$\hat{h}(\tau,v)$ is an estimated spreading function of the channel, and $S^*(n,l)$ is a conjugate of $S(n,l)$.

$$corr(\tau, v) = \frac{1}{\sqrt{NM}} \sum_{n,l} |S(n, l)|^2 \cdot e^{-j2\pi\left(\frac{\tau n}{N} - \frac{lv}{M}\right)}$$

is an autocorrelation function of S(n,l). An autocorrelation function of a signal is used to represent a correlation function of the signal and a signal obtained after delay τ transform and Doppler translation ν transform are performed on the signal.

Further, τ and ν are integers, 0≤τ<N−1, and −M/2≤ν<M/2. When corr(0,0)=1, and when τ≠0 or ν≠0, corr(τ,ν)=0. In this case, the autocorrelation function corr(τ,ν) of S(n,l) presents a perfect autocorrelation characteristic, and it may be considered as $\hat{h}(\tau,v)$=h(τ,ν). The foregoing describes a concept of perfect autocorrelation from a mathematical definition. The perfect autocorrelation may alternatively be represented as that the signal is two-dimensional orthogonal to the signal obtained after delay τ≠0 transform or Doppler translation ν≠0 transform are performed on the signal, that is, two-dimensional correlation between the signal and the signal obtained after delay τ≠0 transform or Doppler translation ν≠0 transform are performed on the signal is 0. That is, when S(n,l) presents perfect autocorrelation, h(τ,ν) may be obtained in a two-dimensional inverse Fourier transform (IFFT$_2$) calculation manner, as shown in the formula (6). It can be learned that, compared with an MMSE manner, h(τ,ν) can be resolved in the foregoing calculation manner without combining a plurality of equation sets, and algorithm complexity is greatly reduced.

As described above, for an actual channel, a delay range of a plurality of paths is far less than $1/f_{scs}$ and a Doppler frequency shift range is far less than $f_{scs}/2$, that is, for τ>$\tau_{max}$ or |ν|>$v_{max}$, h(τ,ν)=0. Based on this, when τ≠0 or ν≠0, a condition of corr(τ,ν)=0 may be adjusted and relaxed to: When 0≤τ≤$\tau_{max}$ and 0≤|ν|≤$v_{max}$, and τ≠0 or ν≠0, corr(τ,ν)=0.

Therefore, the first reference signal transmitted by the transmit end device in the step 401 is two-dimensional orthogonal to the second reference signal obtained after delay τ transform and Doppler translation ν transform are performed on the first reference signal in the transmission process, where 0≤τ≤$\tau_{max}$ or 0≤|ν|≤$v_{max}$, and τ≠0 or ν≠0. In this case, h(τ,ν) may be calculated in the foregoing manner, to greatly reduce calculation complexity.

In an implementation, to resolve a problem that code division multiplexing cannot be performed on reference signals transmitted through different ports, to better support a multi-antenna transmission scenario, it is assumed that the first reference signal corresponds to a port a in the multi-antenna transmission scenario, and a fourth reference signal corresponds to a port b in the multi-antenna transmission scenario. To implement code division multiplexing on the first reference signal and the fourth reference signal, cross-correlation of the two signals may be further constrained:

$$|corr_{a,b}(\tau, v)| = \left|\frac{1}{\sqrt{NM}}\sum_{n,l} S_a(n, l) \cdot S_b^*(n, l) \cdot e^{-j2\pi\left(\frac{\tau n}{N} - \frac{lv}{M}\right)}\right| < \epsilon \quad \text{Formula (7)}$$

$S_a(n,l)$ is the first reference signal transmitted by the transmit end device at the port a, and $S_b(n,l)$ is the fourth reference signal transmitted by the transmit end device at the port b. $corr_{a,b}(\tau,v)$ is a cross-correlation function of $S_a(n,l)$ and $S_b(n,l)$. A cross-correlation function of two signals is used to represent a correlation function of a signal and a signal obtained after delay $\tau$ transform and Doppler translation $v$ transform are performed on another signal. $\epsilon$ is maximum cross-correlation. That is, when for $0 \leq \tau \leq \tau_{max}$ and $0 \leq |v| \leq v_{max}$, $|corr_{a,b}(\tau,v)| < \epsilon$, $corr_{a,b}(\tau,v)$ presents a low cross-correlation characteristic in a range of $0 \leq \tau \leq \tau_{max}$ and $0 \leq |v| v_{max}$. In this case, code division multiplexing may be performed on the first reference signal transmitted through the port a and the fourth reference signal transmitted through the port b. That is, the first reference signal needs to be two-dimensional quasi-orthogonal to a third reference signal. The third reference signal is a reference signal obtained by the receive end device after delay $\tau$ transform and Doppler translation $v$ transform are performed on the fourth reference signal in the transmission process, where $0 \leq \tau \leq \tau_{max}$ and $0 \leq |v| \leq v_{max}$. A meaning of two-dimensional quasi-orthogonal may be further described from the following angle: An absolute value of a value of a two-dimensional correlation function of two signals is less than $\epsilon$.

Correspondingly, in the multi-antenna transmission scenario, from a perspective of the receive end device, the fifth reference signal received by the receive end device may further include the third reference signal, and in an implementation, the fifth reference signal includes the third reference signal and the fourth reference signal. The fifth reference signal includes a combination of the reference signals in the foregoing examples, and may be specifically a weighted value of the reference signals.

In this implementation, it is possible to transmit a reference signal through multi-port multiplexing, communication efficiency is improved, and massive multiple-input multiple-output (massive multiple-input multiple output, massive MIMO) is effectively supported.

Embodiment 2

In the method in Embodiment 1, to resolve the disadvantages in the conventional technology, an autocorrelation characteristic of a reference signal is limited, and a cross-correlation characteristic of the reference signal is further limited.

Based on Embodiment 1, Embodiment 2 provides a design of a reference signal, which meets a requirement of Embodiment 1 for a reference signal.

An expression of the first reference signal in Embodiment 1 may be:

n and l are respectively a subcarrier index number and a symbol index number of an RE occupied by the first reference signal, $u_n$ and $u_l$ represent roots of the first reference signal, and $\alpha_n$ and $\alpha_l$ respectively represent a frequency domain offset and a time-frequency offset of the first reference signal, that is, $\alpha_n$ and $\alpha_l$ respectively represent a subcarrier index number of a first RE occupied by the first reference signal and a symbol index number of the first RE occupied by the first reference signal. $k_n$ and $k_l$ respectively represent a frequency domain spacing and a time domain spacing between resource elements occupied by the first reference signal, N is a length of a frequency domain range of the first reference signal (that is, a frequency domain range occupied by the first reference signal on a frequency domain, or referred to as a frequency domain span of the first reference signal), M is a length of a time domain range of the first reference signal (that is, a time domain range occupied by the first reference signal on a time domain, or referred to as a time domain span of the first reference signal), $u_n$, $u_l$, $\alpha_n$, $\alpha_l$, $k_n$, and $k_l$ are all positive integers, $0 \leq \alpha_n < k_n$ and $0 \leq \alpha_l < k_l$, $\beta$ and $\gamma$ are integers greater than or equal to 0, and $$\frac{N}{k_n} \text{ and } M/k_l$$

are prime numbers.

The first reference signal represented by the formula (8) may be referred to as a two-dimensional sparse Zadoff-Chu (ZC) sequence.

In an implementation, a value of $k_n$ is related to N and $\tau_{max}$. For example, $k_n$ is proportional to N and is inversely proportional to $\tau_{max}$. When the length of the frequency domain range of the first reference signal is large and/or a maximum value (corresponding to a first threshold) of a delay of a channel is small, the frequency domain spacing between the resource elements occupied by the first reference signal may be set to be large, that is, from a perspective of a pattern of the first reference signal, the spacing on the frequency domain is wide.

Optionally, $$k_n = \frac{N}{\tau_{max}} \text{ or } k_n = \frac{N^{0.8}}{\tau_{max}}$$

may be set.

In an implementation, a value of $k_l$ is related to M and $v_{max}$. For example, $k_l$ is proportional to M and is inversely proportional to $v_{max}$. When the length of the time domain range of the first reference signal is large and/or a maximum value (corresponding to a second threshold) of a Doppler frequency shift of the channel is small, the time domain spacing between the resource elements occupied by the first reference signal may be set to be large, that is, from the perspective of the pattern of the first reference signal, the spacing on the time domain is wide.

$$S_{2d-sZC}(n, l) = \begin{cases} \exp\left(\dfrac{-j\pi k_n u_n \beta(\beta+1)}{N} + \dfrac{-j\pi k_l u_l \gamma(\gamma+1)}{M}\right), & n = a_n + \beta k_n, l = a_l + \gamma k_l \\ 0, & n = a_n + \beta k_n, l = a_l + \gamma k_l, n \geq 0, l \geq 0 \end{cases} \quad \text{Formula (8)}$$

Optionally, $$k_l = \frac{M}{2v_{max}} \text{ or } k_l = \frac{M^{0.8}}{v_{max}}$$

may be set.

Figure 4A:
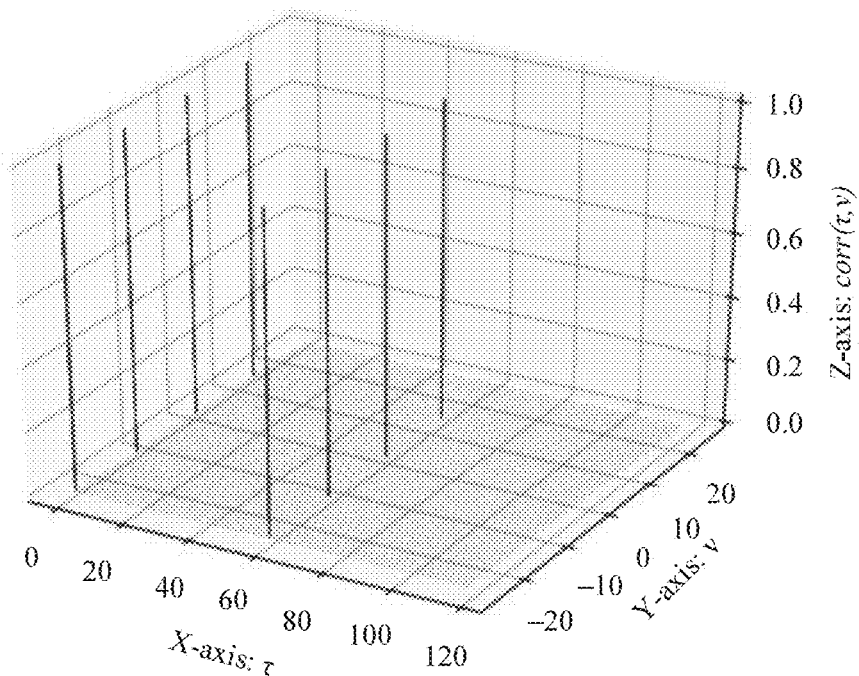
FIG. 4(*a*) is a diagram of an autocorrelation characteristic of a first reference signal according to an embodiment of this application.
Figure 4B:
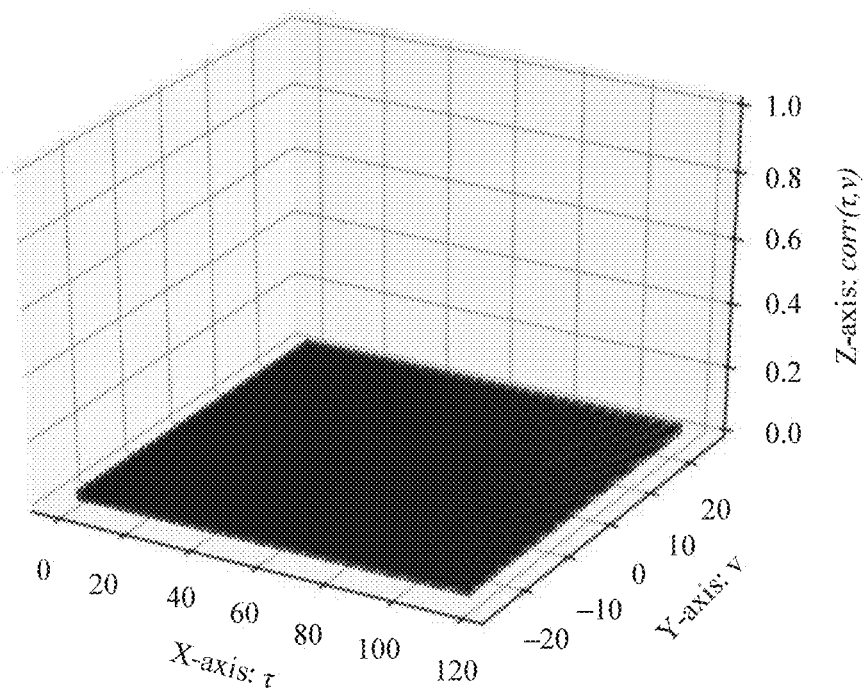

In an implementation, it is assumed that two thresholds $\tau_{max}$ and $v_{max}$ of a time and frequency doubly selective channel meet $v_{max}=M/(2k_l)$ and $\tau_{max}=N/k_n$, an autocorrelation function and a cross-correlation function of the first reference signal described in the formula (8) in the time and frequency doubly selective channel are studied. It may be found that the first reference signal of the formula (8) is two-dimensional orthogonal to the second reference signal, that is, when $0 \leq \tau \leq N/k_n$ and $0 \leq |v| \leq M/(2k_l)$, and $\tau \neq 0$ or $v \neq 0$, $corr(\tau,v)=0$. In addition, the first reference signal is two-dimensional quasi-orthogonal to the third reference signal, that is, when $0 \leq \tau \leq N/k_n$ and $0 \leq |v| \leq M/(2k_l)$, $corr_{a,b}(\tau,v) \leq \epsilon = 1/\sqrt{MN}$. Corresponding mathematical models are shown in FIG. 4(a) and FIG. 4(b), and respectively reflect the autocorrelation characteristic of the first reference signal and the cross-correlation characteristic between the first reference signal and the fourth reference signal. In FIG. 4(a), an x-axis represents $\tau$, a y-axis represents $v$, a z-axis represents $corr(\tau,v)$, and a value of $corr(\tau,v)$ is 1 on only specific (x,y). In FIG. 4(b), an x-axis represents $\tau$, a y-axis represents $v$, a z-axis represents $corr_{a,b}(\tau,v)$, and $corr_{a,b}(\tau,v)$ is less than a specific value on each (x,y). It can be learned that the first reference signal has good autocorrelation performance and cross-correlation performance.

In an implementation, it may be required that a value of $\tau_{max}$ is less than or equal to $N/k_n$, and a value of $v_{max}$ is less than or equal to $M/(2k_l)$. In this way, it can be ensured that a characteristic of the autocorrelation function of the first reference signal and a characteristic of the cross-correlation function of the first reference signal and the third reference signal meet a requirement of Embodiment 1.

Figure 5:
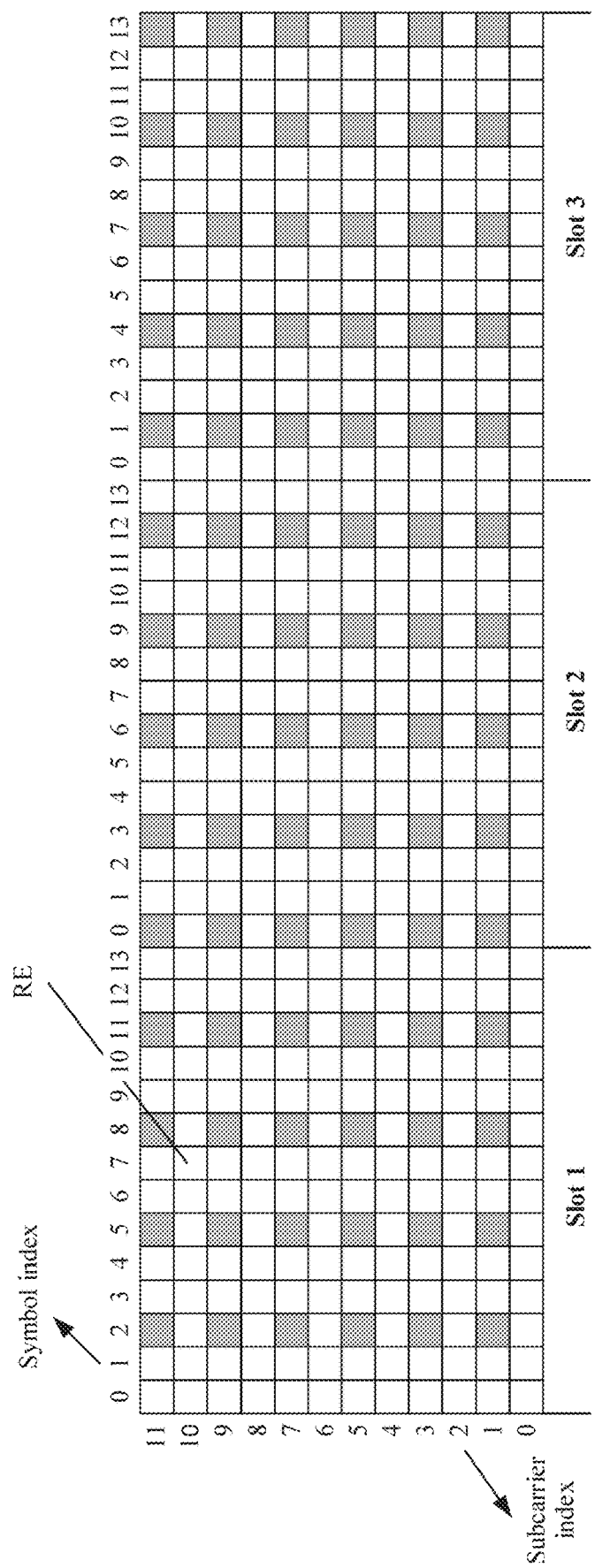
FIG. 5 is a schematic diagram of a pattern of a first reference signal according to an embodiment of this application.

Further, the pattern of the first reference signal designed based on the formula (8) is shown in FIG. 5. A spacing of the first reference signal (occupying a gray RE in the figure) on the frequency domain is two subcarriers, and a spacing of the first reference signal on the time domain is three symbols (in this case, $k_n=2$ and $k_l=3$). It may be found that the pattern of the first reference signal may not be repeated on the time domain by using a single slot as a cycle. Optionally, the pattern of the first reference signal may be repeated on the time domain by using an integral multiple of a single slot as a cycle. In addition, the pattern of the first reference signal may be of a comb-like structure.

Embodiment 3

In a communication system, if a CP length of a start symbol of a slot is different from a CP length of another symbol in the slot, for example, in a scenario in which a subcarrier spacing in an NR communication system is 30 kHz, a CP length of a first symbol in a slot is 88 sampling points, and a CP length of another symbol in the slot is 72 sampling points. In this case, in a time domain range, the autocorrelation characteristic of the first reference signal based on the foregoing embodiment and the cross-correlation characteristic between the first reference signal and another signal may be affected because the first reference signal based on Embodiment 2 is unequally spaced on the time domain in a cross-slot dimension.

Based on Embodiment 1 and Embodiment 2, Embodiment 3 proposes a new design for the first reference signal, to resolve a problem that performance of the first reference signal may be affected because a CP length of a start symbol in a slot is different from a CP length of another symbol in the slot.

In an implementation, phase rotation may be performed on the first reference signal in Embodiment 2 based on different slots, to correct a time domain spacing. For example, in this embodiment, the first reference signal in Embodiment 2 is multiplied by a phase rotation factor $$\exp\left(\frac{j2\pi M_l N_2 n}{N_1}\right)$$

to obtain a new first reference signal. $N_1$ is a quantity of sampling points of a symbol l, $N_2$ is a difference between a quantity of sampling points of a cyclic prefix of a first symbol and a quantity of sampling points of a cyclic prefix of a second symbol, the first symbol is a first symbol of a slot, the second symbol is any symbol other than the first symbol in the slot, and $M_l$ is a serial number of a slot in which a symbol corresponding to l is located.

In an implementation, the formula (8) in Embodiment 2 is further adjusted, and the first reference signal may have the following expression:

$$S_{2d-sZC}(n,l) = \begin{cases} \exp\left(\frac{-j\pi k_n u_n \beta(\beta+1)}{N} + \frac{-j\pi k_l u_l \gamma(\gamma+1)}{M} + \frac{j2\pi M_l N_2 n}{N_1}\right), & n = \alpha_n + \beta k_n, l = \alpha_l + \gamma k_l \\ 0, & n = \alpha_n + \beta k_n, l = \alpha_l + \gamma k_l, n \geq 0, l \geq 0 \end{cases} \quad \text{Formula (9)}$$

n and l are respectively a subcarrier index number and a symbol index number of a resource element occupied by the first reference signal, $u_n$ and $u_l$ represent roots of the first reference signal, $\alpha_n$ and $\alpha_l$ respectively represent a frequency domain offset and a time-frequency offset of the first reference signal, $k_n$ and $k_l$ respectively represent a frequency domain spacing and a time domain spacing between resource elements occupied by the first reference signal, N is a length of a frequency domain range of the first reference signal, M is a length of a time domain range of the first reference signal, $u_n$, $u_l$, $\alpha_n$, $\alpha_l$, $k_n$, and $k_l$ are all positive integers, $\beta$ and $\gamma$ are integers greater than or equal to 0, $$\frac{N}{k_n} \text{ and } M/k_l$$

are prime numbers, $N_1$ is the quantity of sampling points of the symbol corresponding to l, $N_2$ is the difference between the quantity of the sampling points of the cyclic prefix of the first symbol and the quantity of the sampling points of the cyclic prefix of the second symbol, the first symbol is a first symbol of a slot, the second symbol is any symbol other than the first symbol in the slot, and $M_l$ is the serial number of the slot in which the symbol corresponding to l is located.

The first reference signal generated based on the formula (9) may always be equally spaced on the time domain, to ensure good autocorrelation and cross-correlation.

Further, in an implementation, in the step 403 in Embodiment 1, a receiver of the receive end device may add a time domain offset $-M_l*N_2$ when intercepting and receiving a symbol on the slot whose serial number is $M_l$. That is, it is assumed that serial numbers of sampling points of the symbol are 0 to N−1. Then, sampling points from $-M_l*N_2$ to $N-M_l*N_2-1$ are intercepted as symbols of the fifth reference signal.

Embodiments in this application may be used separately or in combination with each other, to achieve different technical effects.

In the foregoing embodiments provided in this application, the communication method provided in embodiments of this application is described from a perspective in which the transmit end device is used as an execution body and a perspective in which the receive end device is used as an execution body. To implement the functions in the communication method provided in the foregoing embodiments of this application, the transmit end device and the receive end device each may include a hardware structure and/or a software module, and implement the foregoing functions in a form of a hardware structure, a software module, or a combination of a hardware structure and a software module. Whether a function in the foregoing functions is performed by using the hardware structure, the software module, or the combination of the hardware structure and the software module depends on particular applications and design constraints of the technical solutions.

Figure 6:
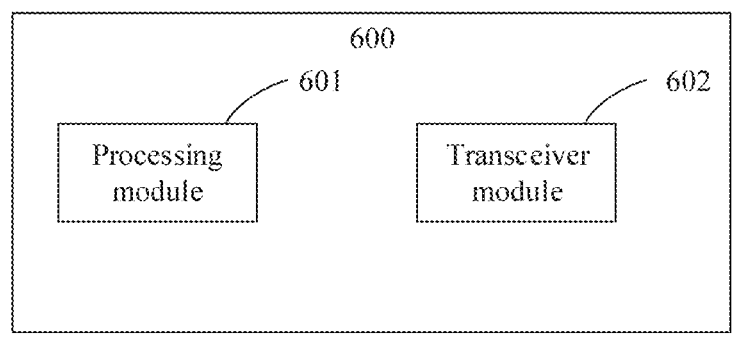
FIG. 6 is a schematic diagram of a structure of an apparatus according to an embodiment of this application.

Same as the foregoing concept, as shown in FIG. 6, an embodiment of this application further provides an apparatus 600. The apparatus 600 includes a transceiver module 602 and a processing module 601.

In an example, the apparatus 600 is configured to implement a function of the transmit end device in the foregoing method. For example, the apparatus may be a terminal device, or may be an apparatus in a terminal device. The apparatus may be a network device, or may be an apparatus in a network device. The apparatus may be a chip system. In this embodiment of this application, the chip system may include a chip, or may include a chip and another discrete device.

The processing module 601 is configured to generate a first reference signal, where the first reference signal is two-dimensional orthogonal to a second reference signal, the second reference signal is a reference signal obtained after delay τ transform and Doppler translation ν transform are performed on the first reference signal in a communication process, $0 \leq \tau \leq \tau_{max}$, $0 \leq |\nu| \leq \nu_{max}$, $\tau \neq 0$ or $\nu \neq 0$, $\tau_{max}$ is a first threshold, $\nu_{max}$ is a second threshold, and |x| represents an absolute value of x.

The transceiver module 602 is configured to transmit the first reference signal.

For a specific performing process and related characteristics of the processing module 601 and the transceiver module 602, refer to the descriptions in the foregoing method embodiments.

In another example, the apparatus 600 is configured to implement a function of the receive end device in the foregoing method. For example, the apparatus may be a terminal device, or may be an apparatus in a terminal device. The apparatus may be a network device, or may be an apparatus in a network device. The apparatus may be a chip system. In this embodiment of this application, the chip system may include a chip, or may include a chip and another discrete device. The transceiver module 602 is configured to receive a fifth reference signal, where the fifth reference signal includes a second reference signal, the second reference signal is two-dimensional orthogonal to a first reference signal, the second reference signal is a reference signal obtained after delay τ transform and Doppler translation ν transform are performed on the first reference signal in a communication process, $0 \leq \tau \leq \tau_{max}$, $0 \leq |\nu| \leq \nu_{max}$, $\tau \neq 0$ or $\nu \neq 0$, $\tau_{max}$ is a first threshold, $\nu_{max}$ is a second threshold, and |x| represents an absolute value of x.

The processing module 601 is configured to obtain channel state information based on the fifth reference signal.

For a specific performing process of the processing module 601 and the transceiver module 602, refer to the descriptions in the foregoing method embodiments.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Figure 7:
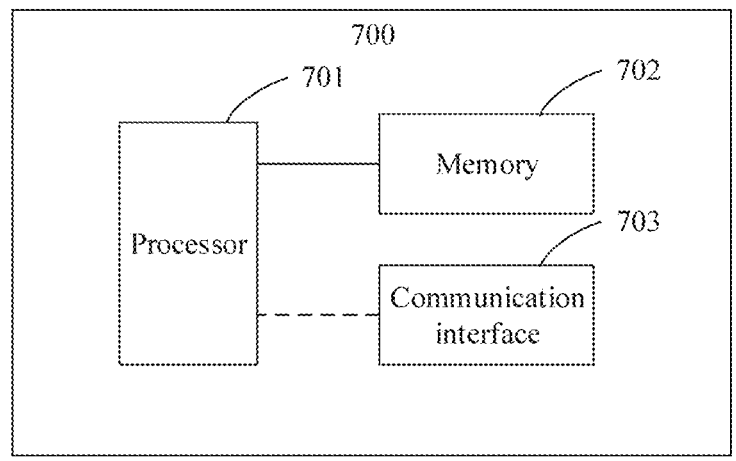
FIG. 7 is a schematic diagram of a structure of an apparatus according to another embodiment of this application.

Same as the foregoing concept, as shown in FIG. 7, an embodiment of this application further provides an apparatus 700.

In an example, the apparatus 700 is configured to implement a function of the transmit end device in the foregoing method. The apparatus may be a terminal device, or may be an apparatus in a terminal device. The apparatus may be a network device, or may be an apparatus in a network device. The apparatus 700 includes at least one processor 701, configured to implement a function of the transmit end device in the foregoing method. For details, refer to the detailed descriptions in the method. Details are not described herein again.

In some embodiments, the apparatus 700 may further include at least one memory 702, configured to store program instructions and/or data. The memory 702 is coupled to the processor 701. The coupling in this embodiment of this application may be an indirect coupling or a communication connection between apparatuses, units, or modules in an electrical form, a mechanical form, or another form, and is used for information exchange between the apparatuses, the units, or the modules. In another implementation, the memory 702 may alternatively be located outside the apparatus 700. The processor 701 and the memory 702 may cooperatively operate. The processor 701 may execute the program instructions stored in the memory 702, to implement the method performed by the transmit end device in the foregoing embodiments of this application. At least one of the at least one memory may be included in the processor.

In some embodiments, the apparatus 700 may further include a communication interface 703, configured to communicate with another device by using a transmission medium, so that an apparatus used in the apparatus 700 can communicate with the another device. For example, the communication interface 703 may be a transceiver, a circuit, a bus, a module, or another type of communication interface, and the another device may be a receive end device. The processor 701 receives and transmits data through the communication interface 703, to implement the method performed by the transmit end device in the foregoing embodiments.

In an example, the apparatus 700 is configured to implement a function of the receive end device in the foregoing method. The apparatus may be a network device, or may be an apparatus in a network device. The apparatus may be a terminal device, or may be an apparatus in a terminal device. The apparatus 700 includes at least one processor 701, configured to implement a function of the receive end device in the foregoing method. For details, refer to the detailed descriptions in the method. Details are not described herein again.

In some embodiments, the apparatus 700 may further include at least one memory 702, configured to store program instructions and/or data. The memory 702 is coupled to the processor 701. The coupling in this embodiment of this application may be an indirect coupling or a communication connection between apparatuses, units, or modules in an electrical form, a mechanical form, or another form, and is used for information exchange between the apparatuses, the units, or the modules. In another implementation, the memory 702 may alternatively be located outside the apparatus 700. The processor 701 and the memory 702 may cooperatively operate. The processor 701 may execute the program instructions stored in the memory 702. At least one of the at least one memory may be included in the processor.

In some embodiments, the apparatus 700 may further include a communication interface 703, configured to communicate with another device by using a transmission medium, so that an apparatus used in the apparatus 700 can communicate with the another device. For example, the communication interface 703 may be a transceiver, a circuit, a bus, a module, or another type of communication interface, and the another device may be a transmit end device. The processor 701 receives and transmits data through the communication interface 703, to implement the method in the foregoing embodiments.

A connection medium between the communication interface 703, the processor 701, and the memory 702 is not limited in this embodiment of this application. For example, in this embodiment of this application, in FIG. 7, the memory 702, the processor 701, and the communication interface 703 may be connected by using a bus, and the bus may be an address bus, a data bus, a control bus, or the like.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by using a combination of hardware in the processor and a software module.

In this embodiment of this application, the memory may be a non-volatile memory, for example, a hard disk drive (hard disk drive, HDD) or a solid-state drive (solid-state drive, SSD), or may be a volatile memory (volatile memory), for example, a random access memory (random-access memory, RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

All or some of the methods in embodiments of this application may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

It is clearly that, a person skilled in the art can make various modifications and variations to this application without departing from the scope of this application. In this way, this application is intended to cover these modifications and variations of this application provided that they fall within the scope of protection defined by the following claims and their equivalent technologies.

What is claimed is:

1. A communication method, comprising:
    generating a first reference signal for channel estimation, wherein the first reference signal is two-dimensional orthogonal to a second reference signal, the second reference signal is a reference signal obtained after delay $\tau$ transform and Doppler frequency shift $v$ transform are performed on the first reference signal in a communication process, $0 \leq \tau \leq \tau_{max}$, $0 \leq |v| \leq v_{max}$, $\tau \neq 0$ or $v \neq 0$, $\tau_{max}$ is a first threshold, $v_{max}$ is a second threshold, and $|v|$ represents an absolute value of $v$, and wherein $\tau_{max}$ is less than or equal to $N/k_n$, and $v_{max}$ is less than or equal to $M/(2k_l)$, $k_n$ and $k_l$ respectively represent a frequency domain spacing and a time domain spacing between resource elements occupied by the first reference signal, N is a length of a frequency domain range of the first reference signal, M is a length of a time domain range of the first reference signal; and
    transmitting the first reference signal to a second device.

2. The method according to claim 1, wherein the first reference signal is two-dimensional quasi-orthogonal to a third reference signal, the third reference signal is a reference signal obtained after $\tau$ transform and $v$ transform are performed on a fourth reference signal, and code division multiplexing is performed on the first reference signal and the fourth reference signal.

3. The method according to claim 1, wherein the frequency domain spacing between resource elements occupied by the first reference signal is proportional to the length of the frequency domain range of the first reference signal, and is inversely proportional to $\tau_{max}$; and a time domain spacing between the resource elements occupied by the first reference signal is proportional to a length of the time domain range of the first reference signal, and is inversely proportional to $v_{max}$.

4. The method according to claim 1, wherein a cycle of a pattern of resource elements occupied by the first reference signal is an integral multiple of a slot corresponding to the first reference signal.

5. The method according to claim 1, wherein an expression of the first reference signal is:

$$S_{2d-sZC}(n, l) = \begin{cases} \exp\left(\frac{-j\pi k_n u_n \beta(\beta+1)}{N} + \frac{-j\pi k_l u_l \gamma(\gamma+1)}{M}\right), & n = \alpha_n + \beta k_n, l = \alpha_l + \gamma k_l \\ 0, & n \neq \alpha_n + \beta k_n, l \neq \alpha_l + \gamma k_l \end{cases}$$

wherein n and l are respectively a subcarrier index number and a symbol index number of resource elements occupied by the first reference signal, n≥0,l≥0, $u_n$ and $u_l$ represent roots of the first reference signal, $\alpha_n$ and $\alpha_l$ respectively represent a frequency domain offset and a time-frequency offset of the first reference signal, $u_n$, $u_l$, $\alpha_n$, $\alpha_l$, $k_n$, and $k_l$ are all positive integers, $\beta$ and $\gamma$ are integers greater than or equal to 0, and $$\frac{N}{k_n} \text{ and } M/k_l$$

are prime numbers.

6. The method according to claim 1, wherein an expression of the first reference signal is:

$$S_{2d-sZC}(n, l) = \begin{cases} \exp\left(\frac{-j\pi k_n u_n \beta(\beta+1)}{N} + \frac{-j\pi k_l u_l \gamma(\gamma+1)}{M} + \frac{j2\pi M_l N_2 n}{N_1}\right), & n = \alpha_n + \beta k_n, l = \alpha_l + \gamma k_l \\ 0, & n = \alpha_n + \beta k_n, l = \alpha_l + \gamma k_l \end{cases}$$

wherein n and l are respectively a subcarrier index number and a symbol index number of resource elements occupied by the first reference signal, n≥0,l≥0, $u_n$ and $u_l$ represent roots of the first reference signal, $\alpha_n$ and $\alpha_l$ respectively represent a frequency domain offset and a time-frequency offset of the first reference signal, $u_n$, $u_l$, $\alpha_n$, $\alpha_l$, $k_n$, and $k_l$ are all positive integers, $\beta$ and $\gamma$ are integers greater than or equal to 0, $$\frac{N}{k_n} \text{ and } M/k_l$$

are prime numbers, $N_1$ is a quantity of sampling points of a symbol corresponding to l, $N_2$ is a difference between a quantity of sampling points of a cyclic prefix of a first symbol and a quantity of sampling points of a cyclic prefix of a second symbol, the first symbol is a first symbol of a slot, the second symbol is any symbol other than the first symbol in the slot, and $M_l$ is a serial number of a symbol corresponding to l in a slot of the symbol corresponding to l.

7. The method according to claim 5, wherein $$k_n = \frac{N}{\tau_{max}} \text{ and } k_l = \frac{M}{2v_{max}}.$$

8. A communication apparatus, comprising:
at least one processor; and
one or more memories including computer instructions that, when executed by the at least one processor, cause the communication apparatus to perform operations comprising:
generating a first reference signal for channel estimation, wherein the first reference signal is two-dimensional orthogonal to a second reference signal, the second reference signal is a reference signal obtained after delay $\tau$ transform and Doppler frequency shift $v$ transform are performed on the first reference signal in a communication process, $0 \leq \tau \leq \tau_{max}$, $0 \leq |v| \leq v_{max}$, $v \neq 0$ or $v \neq 0$, $\tau_{max}$ is a first threshold, $v_{max}$ is a second threshold, and $|v|$ represents an absolute value of $v$, and wherein $\tau_{max}$ is less than or equal to $N/k_n$, and $v_{max}$ is less than or equal to $M/(2k_l)$, $k_n$ and $k_l$ respectively represent a frequency domain spacing and a time domain spacing between resource elements occupied by the first reference signal, N is a length of a frequency domain range of the first reference signal, M is a length of a time domain range of the first reference signal; and
transmitting the first reference signal to a second device.

9. The apparatus according to claim 8, wherein the first reference signal is two-dimensional quasi-orthogonal to a third reference signal, the third reference signal is a reference signal obtained after $\tau$ transform and $v$ transform are performed on a fourth reference signal, and code division multiplexing is performed on the first reference signal and the fourth reference signal.

10. The apparatus according to claim 8, wherein the frequency domain spacing between resource elements occupied by the first reference signal is proportional to the length of the frequency domain range of the first reference signal, and is inversely proportional to $\tau_{max}$; and a time domain spacing between the resource elements occupied by the first reference signal is proportional to a length of the time domain range of the first reference signal, and is inversely proportional to $v_{max}$.

11. The apparatus according to claim 8, wherein a cycle of a pattern of resource elements occupied by the first reference signal is an integral multiple of a slot corresponding to the first reference signal.

12. The apparatus according to claim 8, wherein an expression of the first reference signal is:

$$S_{2d-sZC}(n, l) =$$

$$\begin{cases} \exp\left(\dfrac{-j\pi k_n u_n \beta(\beta+1)}{N} + \dfrac{-j\pi k_l u_l \gamma(\gamma+1)}{M}\right), & n = \alpha_n + \beta k_n, l = \alpha_l + \gamma k_l \\ 0, & n \neq \alpha_n + \beta k_n, l \neq \alpha_l + \gamma k_l \end{cases}$$

wherein n and l are respectively a subcarrier index number and a symbol index number of resource elements occupied by the first reference signal, n≥0, l≥0, $u_n$ and $u_l$ represent roots of the first reference signal, $\alpha_n$ and $\alpha_l$ respectively represent a frequency domain offset and a time-frequency offset of the first reference signal, $u_n$, $u_l$, $\alpha_n$, $\alpha_l$, $k_n$, and $k_l$ are all positive integers, β and γ are integers greater than or equal to 0, and $$\dfrac{N}{k_n} \text{ and } M/k_l$$

are prime numbers.

13. The apparatus according to claim 8, wherein an expression of the first reference signal is:

$$S_{2d-sZC}(n, l) =$$

$$\begin{cases} \exp\left(\dfrac{-j\pi k_n u_n \beta(\beta+1)}{N} + \dfrac{-j\pi k_l u_l \gamma(\gamma+1)}{M} + \dfrac{j2\pi M_l N_2 n}{N_1}\right), & n = \alpha_n + \beta k_n, l = \alpha_l + \gamma k_l \\ 0, & n = \alpha_n + \beta k_n, l = \alpha_l + \gamma k_l \end{cases}$$

wherein n and l are respectively a subcarrier index number and a symbol index number of resource elements occupied by the first reference signal, n≥0, l≥0, $u_n$ and $u_l$ represent roots of the first reference signal, $\alpha_n$ and $\alpha_l$ respectively represent a frequency domain offset and a time-frequency offset of the first reference signal, $u_n$, $u_l$, $\alpha_n$, $\alpha_l$, $k_n$, and $k_l$ are all positive integers, β and γ are integers greater than or equal to 0, $$\dfrac{N}{k_n} \text{ and } M/k_l$$

are prime numbers, $N_1$ is a quantity of sampling points of a symbol corresponding to l, $N_2$ is a difference between a quantity of sampling points of a cyclic prefix of a first symbol and a quantity of sampling points of a cyclic prefix of a second symbol, the first symbol is a first symbol of a slot, the second symbol is any symbol other than the first symbol in the slot, and $M_l$ is a serial number of a symbol corresponding to l in a slot of the symbol corresponding to l.

14. The apparatus according to claim 12, wherein $$k_n = \dfrac{N}{\tau_{max}} \text{ and } k_l = \dfrac{M}{2v_{max}}.$$

15. A communication apparatus, comprising:
at least one processor; and
one or more memories including computer instruction that, when executed by the at least one processor, cause the communication apparatus to perform operations comprising:
receiving a fifth reference signal from a first device, wherein the fifth reference signal comprises a second reference signal, the second reference signal is two-dimensional orthogonal to a first reference signal, the second reference signal is a reference signal obtained after delay τ transform and Doppler frequency shift ν transform are performed on the first reference signal in a communication process, 0≤τ≤$\tau_{max}$, 0≤|ν|≤$v_{max}$, τ≠0 or ν≠0, $\tau_{max}$ is a first threshold, $v_{max}$ is a second threshold, and |ν| represents an absolute value of ν, and wherein $\tau_{max}$ is less than or equal to $N/k_n$, and $v_{max}$ is less than or equal to $M/(2k_l)$, $k_n$ and $k_l$ respectively represent a frequency domain spacing and a time domain spacing between resource elements occupied by the first reference signal, N is a length of a frequency domain range of the first reference signal, M is a length of a time domain range of the first reference signal; and
obtaining channel state information based on the fifth reference signal.

16. The apparatus according to claim 15, wherein the fifth reference signal further comprises a third reference signal, the first reference signal is two-dimensional quasi-orthogonal to the third reference signal, the third reference signal is a reference signal obtained after τ transform and ν transform are performed on a fourth reference signal, and code division multiplexing is performed on the first reference signal and the fourth reference signal.

17. The apparatus according to claim 15, wherein the frequency domain spacing between resource elements occupied by the first reference signal is proportional to the length of the frequency domain range of the first reference signal, and is inversely proportional to $\tau_{max}$; and a time domain spacing between the resource elements occupied by the first reference signal is proportional to a length of the time domain range of the first reference signal, and is inversely proportional to $v_{max}$.

18. The apparatus according to claim 15, wherein a cycle of a pattern of resource elements occupied by the first reference signal is an integral multiple of a slot corresponding to the first reference signal.

19. The apparatus according to claim 15, wherein an expression of the first reference signal is:

$$S_{2d-sZC}(n, l) =$$

$$\begin{cases} \exp\left(\dfrac{-j\pi k_n u_n \beta(\beta+1)}{N} + \dfrac{-j\pi k_l u_l \gamma(\gamma+1)}{M}\right), & n = \alpha_n + \beta k_n, l = \alpha_l + \gamma k_l \\ 0, & n \neq \alpha_n + \beta k_n, l \neq \alpha_l + \gamma k_l \end{cases}$$

wherein n and l are respectively a subcarrier index number and a symbol index number of resource elements occupied by the first reference signal, n≥0, l≥0, $u_n$ and $u_l$ represent roots of the first reference signal, $\alpha_n$ and $\alpha_l$ respectively represent a frequency domain offset and a time-frequency offset of the first reference signal, $u_n$, $u_l$, $\alpha_n$, $\alpha_l$, $k_n$, and $k_l$ are all positive integers, β and γ are integers greater than or equal to 0, and $$\dfrac{N}{k_n} \text{ and } M/k_l$$

are prime numbers.

20. The apparatus according to claim 15, wherein an expression of the first reference signal is:

$$S_{2d-sZC}(n, l) = \begin{cases} \exp\left(\dfrac{-j\pi k_n u_n \beta(\beta+1)}{N} + \dfrac{-j\pi k_l u_l \gamma(\gamma+1)}{M} + \dfrac{j2\pi M_l N_2 n}{N_1}\right), & n = \alpha_n + \beta k_n, l = \alpha_l + \gamma k_l \\ 0, & n \neq \alpha_n + \beta k_n, l \neq \alpha_l + \gamma k_l \end{cases}$$

wherein
- n and l are respectively a subcarrier index number and a symbol index number of resource elements occupied by the first reference signal, n≥0, l≥0, $u_n$ and $u_l$ represent roots of the first reference signal, $\alpha_n$ and $\alpha_l$ respectively represent a frequency domain offset and a time-frequency offset of the first reference signal, $u_n$, $u_l$, $\alpha_n$, $\alpha_l$, $k_n$, and $k_l$ are all positive integers, β and γ are integers greater than or equal to 0, $$\frac{N}{k_n} \text{ and } M/k_l$$

are prime numbers, $N_1$ is a quantity of sampling points of a symbol corresponding to l, $N_2$ is a difference between a quantity of sampling points of a cyclic prefix of a first symbol and a quantity of sampling points of a cyclic prefix of a second symbol, the first symbol is a first symbol of a slot, the second symbol is any symbol other than the first symbol in the slot, and $M_l$ is a serial number of a symbol corresponding to l in a slot of the symbol corresponding to l.

* * * * *